Feb. 13, 1951 J. BOLSEY 2,541,193
RANGE FINDER MECHANISM
Original Filed Dec. 31, 1940

INVENTOR.
Jacques Bolsey
BY

Patented Feb. 13, 1951

2,541,193

UNITED STATES PATENT OFFICE 2,541,193

RANGE FINDER MECHANISM

Jacques Bolsey, New York, N. Y.

Original application April 30, 1943, Serial No. 485,177, which is a substitute for application Serial No. 372,507, December 31, 1940. Divided and this application August 22, 1946, Serial No. 692,318. In Switzerland November 8, 1940

Section 1, Public Law 690, August 8, 1946
Patent expires November 8, 1960

5 Claims. (Cl. 88—2.4)

My present invention relates to improvements in photographic and cinematographic cameras and more particularly to a combined range- and view-finder unit adapted to be built-in or mounted as separate unit to cameras of the above type.

My present application is a division of my prior application Serial No. 485,177, now Patent No. 2,407,917, which in turn is a substitute for abandoned application Serial No. 372,507, filed December 31, 1940.

It is an object to combine a camera with a built-in combined range and view finder arrangement.

A further object of my invention consists in constructive means enabling the use of the same viewing window for range- and view-finding purposes.

Figure 1:
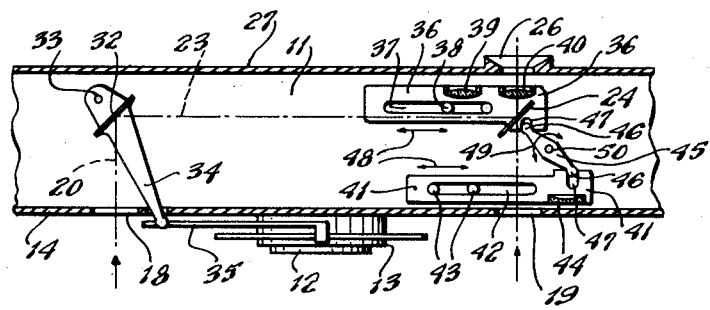
Figure 2:
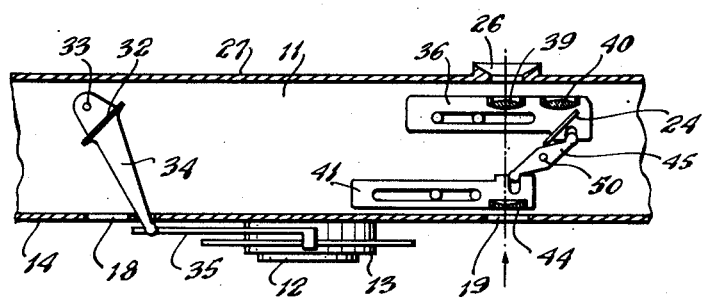

The novel features which I consider as characteristic for my invention are set forth in particular in the appended claims. The invention itself, however, both as to its construction and its method of operation, together with additional objects and advantages thereof will be best understood from the following description of specific embodiments, when read in connection with the accompanying drawings, in which:

Fig. 1 shows a new combined range- and view-finder, with the camera casing in cross-section and the camera itself only partly shown, in range finding position; and Fig. 2 shows the same combined range and view finder, in view finding position.

As shown in the drawing, the camera comprises a camera casing 11, a camera lens 12, a lens mount 13 for lens 12 arranged on the front wall 14 of the camera casing 11, and a rear wall 27.

In accordance with my present invention I combine with the above camera a range finder arrangement comprising two openings 18 and 19 in the front wall 14 of casing 11 defining a horizontal base and adapted to accept two light beams 20 and 21 coming from the object to be photographed; the range finder arrangement further comprises a first reflecting member e. g. a reflecting mirror 32 reflecting light beam 20 along path 23. This mirror is journalled turnably, as indicated by numeral 33, and provided with a lever arm 34 cooperating with a cam 35 mounted on the lens mount 13 and moving together with lens 12. Thus, lever 34 adjusts mirror 32 in accordance with the movement of lens 12.

The second reflecting mirror 24 is arranged on a support 36, secured to the camera body by means of slot 37 and pins 38 near the rear wall 27, slidable parallelly thereto so as to reflect light beam 23 into the viewing opening 26. On this support are mounted, besides mirror 24, the lens 39 forming a part of the view finder unit, and lens 40 forming a part of the range finder unit. A second separate support 41 is arranged near wall 14. This support 41 is secured to the camera body by means of slot 42 and pins 43, slidable parallelly to wall 14. On this support is mounted lens 44 forming a part of the view finder unit.

The lever 45 engages with its lever arms 46 corresponding cut-outs 47 in the supports 36 and 41. A rotatable shaft 50 is secured to lever 45 at its pivoting point for manually turning this lever between the positions shown in Figures 1 and 2. Thus, it is possible to shift by turning shaft 50 the lever 45 in the direction indicated by arrows 49. This will result in shifting of the supports 36 and 41 in direction of arrows 48 from their position shown in Fig. 1 into their position shown in Fig. 2, and back. It is evident that in its position, shown in Fig. 1, the range- and view-finder unit is adapted for range-finding, while in its position shown in Fig. 2 it is able to serve for view-finding. Thus, by shifting the supports from one position into the other, I may use the same viewing window either for range- or for view-finding purposes.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and therefore such adaptations should and are intended to be comprehended within the meaning and range of equivalence of the following claims.

What I claim as new and desire to secure by Letters Patent is:

1. In a camera of the character described, a combined range and view finder unit comprising two openings in the front wall of the camera casing defining a horizontal base and adapted to accept two light beams coming from the object to be photographed, a first reflecting member arranged inside of said casing in the path of the first of said light beams and reflecting it inside of said casing along a path parallel to said camera front wall, a second reflecting member arranged at least partly in the path of the second of said light beams and adapted to reflect said reflected first light beam in a direction parallel to the path of said second light beam, a movable support for said second reflecting member for moving said member out of the path of said second light beam, a viewing opening in the rear wall of said camera casing arranged in the path of said second and said twice reflected first light beams, a view finder lens, a movable support for said view finder lens, and means to move said movable support with said view finder lens in the path of said second light beam when said reflecting member is moved out of its path, respectively, to move it out of the path of said second light beam when said reflecting member is moved into its path.

2. In a camera of the character described, a combined range and view finder unit comprising two openings in the front wall of the camera casing defining a horizontal base and adapted to accept two light beams coming from the object to be photographed, a first reflecting member arranged inside of said casing in the path of the first of said light beams and reflecting it inside of said casing along a path parallel to said camera front wall, a second reflecting member arranged at least partly in the path of the second of said light beams and adapted to reflect said reflected first light beam in a direction parallel to the path of said second light beam, a movable support for said second reflecting member for moving said member out of the path of said second light beam, a viewing opening in the rear wall of said camera casing arranged in the path of said second and said twice reflected first light beams, a view finder lens, a movable common support for said view finder lens and said second reflecting member, and means to move said common support so as to simultaneously move said view finder lens into the path of said second light beam and to move said second reflecting member out of this path, and vice versa.

3. In a camera of the character described, a combined range and view finder unit comprising two openings in the front wall of the camera casing defining a horizontal base and adapted to accept two light beams coming from the object to be photographed, a first reflecting member arranged inside of said casing in the path of the first of said light beams and reflecting it inside of said casing along a path parallel to said camera front wall, a second reflecting member arranged at least partly in the path of the second of said light beams and adapted to reflect said reflected first light beam in a direction parallel to the path of said second light beam, a movable support for said second reflecting member for moving said member out of the path of said second light beam, a viewing opening in the rear wall of said camera casing arranged in the path of said second and said twice reflected first light beams, a view finder lens, a movable common support for said view finder lens and said second reflecting member, and an operating member adapted to act by at least one lever on said support in such a manner as to shift simultaneously said view finder lens into the path of said second light beam and to shift said second reflecting member out of its path, respectively, to shift simultaneously said view finder lens out of the path of said second light beam and shift said second reflecting member into its path.

4. In a camera of the character described, a combined range and view finder unit comprising two openings in the front wall of the camera casing defining a horizontal base and adapted to accept two light beams coming from the object to be photographed, a first reflecting member arranged inside of said casing in the path of the first of said light beams and reflecting it inside of said casing along a path parallel to said camera front wall, a second reflecting member arranged at least partly in the path of the second of said light beams and adapted to reflect said reflected first light beam in a direction parallel to the path of said second light beam, a movable support for said second reflecting member for moving said member out of the path of said second light beam, a viewing opening in the rear wall of said camera casing arranged in the path of said second and said twice reflected first light beams, and at least partly movable view finder lens system, a movable common support for at least one of the lenses of said lens system and for said second reflecting member, said common support arranged near the rear wall of the camera casing, a separate movable support for at least one other lens of said lens system, said separate support arranged near the front wall of said casing, a lever-like member provided with two lever arms, each of these lever arms engaging one of said supports, and a rotatable shaft secured to a central point of said lever for simultaneously shifting said second reflecting member out of the path of said second light beam and shifting said lens system in the path thereof, and vice versa.

5. In a camera of the character described, a combined range and view finder unit comprising two openings in the front wall of the camera casing defining a horizontal base and adapted to accept two light beams coming from the object to be photographed, a first reflecting member arranged inside of said casing in the path of the first of said light beams and reflecting it inside of said casing along a path parallel to said camera front wall, a second reflecting member arranged at least partly in the path of the second of said light beams and adapted to reflect said reflected first light beam in a direction parallel to the path of said second light beam, a movable support for said second reflecting member for moving said member out of the path of said second light beam, a viewing opening in the rear wall of said camera casing arranged in the path of said second and said twice reflected first light beams, a view finder lens system, a range finder lens arranged in operative range finding position between said second reflecting member and said viewing opening, a common support for at least one of the lenses of said view finder lens system, for said second reflecting member and for said range finder lens, said common support arranged near the rear wall of the camera casing slidable parallel thereto, a separate support for at least one other lens of said view finder lens system, said separate support arranged near the front wall of said casing slidable parallel thereto, a lever-like member provided with two lever arms, each of these lever arms engaging one of said supports, and a rotatable shaft secured to a central point of said lever for simultaneously shifting said second reflecting member and said range finder lens out of the path of said second light beam and shifting said view finder lens system into the path thereof, and vice versa.

JACQUES BOLSEY.

REFERENCES CITED

The following references are of record in the file of this patent:

UNITED STATES PATENTS

| Number | Name | Date |
|---|---|---|
| 2,032,060 | Kuppenbender | Feb. 25, 1936 |
| 2,123,465 | Gehrke | July 12, 1938 |
| 2,229,855 | Liebmann | Jan. 28, 1941 |

FOREIGN PATENTS

| Number | Country | Date |
|---|---|---|
| 238,702 | Switzerland | Nov. 16, 1945 |
| 238,793 | Switzerland | Nov. 16, 1945 |